No. 695,290. Patented Mar. 11, 1902.
G. R. DODD.
POLE HOISTER.
(Application filed Aug. 26, 1901.)
(No Model.)
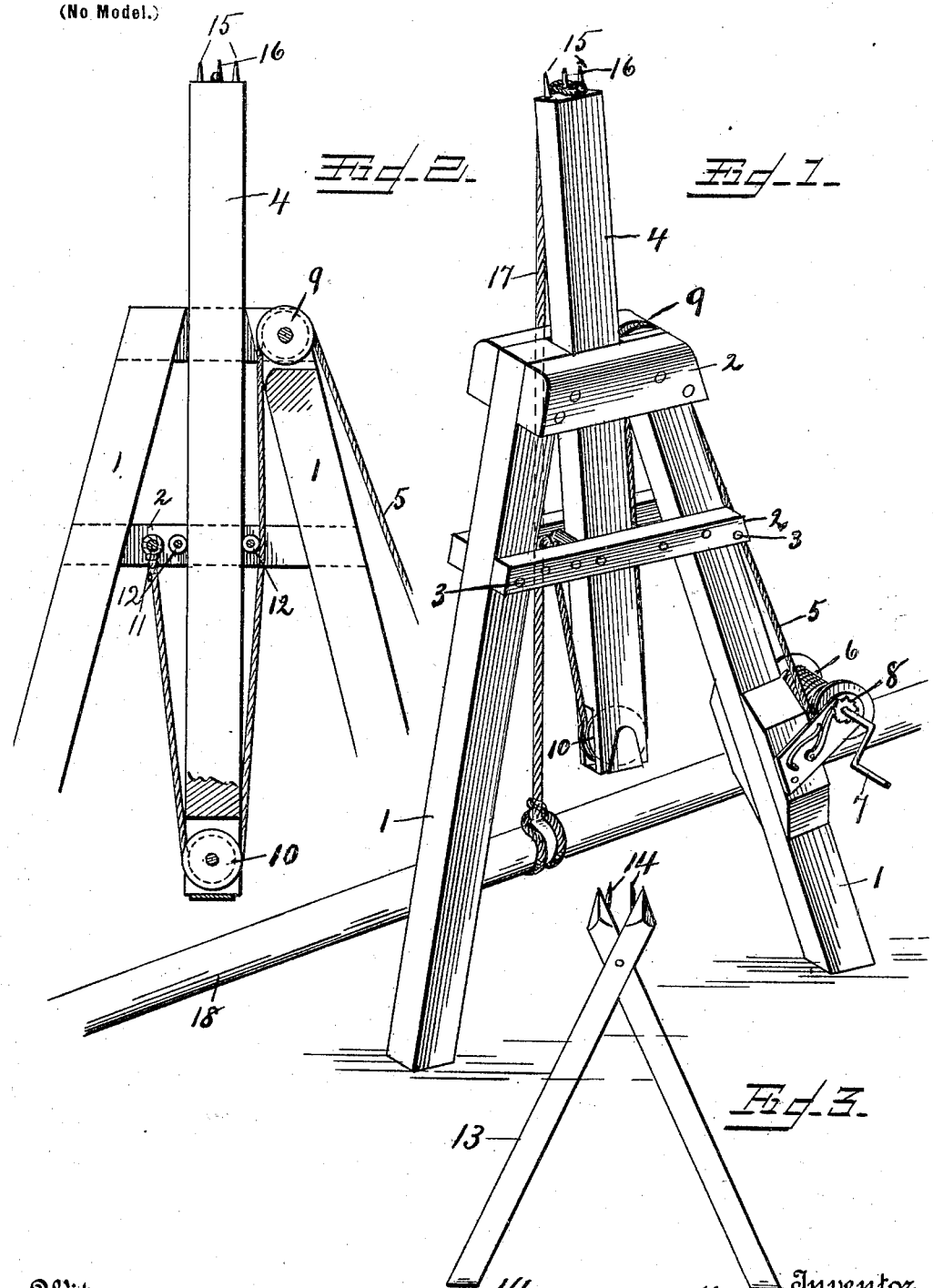
Witnesses
F. L. Ourand
Joseph D. Wright
Inventor
George R. Dodd
By John A. Saul
Attorney
THE NORRIS PETERS CO., PHOTO-LITHO., WASHINGTON, D. C.

United States Patent Office.

GEORGE R. DODD, OF ANDERSON, SOUTH CAROLINA.

POLE-HOISTER.

SPECIFICATION forming part of Letters Patent No. 695,290, dated March 11, 1902.

Application filed August 26, 1901. Serial No. 73,236. (No model.)

*To all whom it may concern:*

Be it known that I, GEORGE R. DODD, a citizen of the United States, residing at Anderson, in the county of Anderson and State of South Carolina, have invented new and useful Improvements in Pole-Hoisters, of which the following is a specification.

My invention relates to pole or timber hoisters, and is designed to raise telegraph-poles, timbers, iron beams, and the like in an easy and expeditious manner.

In the drawings forming a part of this specification and in which like symbols of reference represent corresponding parts in the several views, Figure 1 is a perspective view of my invention; Fig. 2, a sectional side elevation, and Fig. 3 a view of a fork or brace to hold the timber as it is being raised.

The main body of the device is formed of legs 1, set at an angle toward each other and held in place by cross-pieces 2, back and front, and bolted to the uprights by bolts 3.

4 is a rod which is supported by the main frame and is adapted to be raised and lowered by means of a rope or the like 5, running over a barrel or windlass 6, operated by a winch 7 and adapted to be locked by a pawl-and-ratchet arrangement 8. The rope 5 passes over pulleys 9 and 10, journaled, respectively, in top of one of the legs 1 and in bottom of rod 4, and is connected to a pin or journal 11, supported by the cross-pieces 2.

12 represents antifriction-rollers supported upon journals in the cross-pieces 2, the purpose of the same being to facilitate operation of the vertical rod 4.

13 is a fork having spikes 14 at its top and bottom, the object of the top spikes being to engage the timber being raised and the leg-spikes to take into the ground and prevent slipping. The main frame also has spikes at its base to prevent slipping and spikes 15 at its top to engage the timber. A hook or spike 16 is also provided upon the rod 4, which is adapted to receive and hold the rope 17, for a purpose to be presently explained.

The operation of the device is as follows: I first attach the rope 17 to the timber 18 to be raised and connect its other end to the hook 16, and by operating the windlass the pole or timber is raised from the ground. I then place the fork 13 under the timber to support it in its raised position and then place the rod 4 under the timber, and by operating the winch the timber is again raised and the fork 13 may be again shifted to further elevate the timber. By this means the timber may be elevated to a vertical position, one man doing the work of many, as will be apparent from the power gained.

Having now fully described my invention and in what manner the same may be used, what I claim as my invention, and desire to secure by Letters Patent, is—

1. In a device of the character described, a main frame, a rod working in the same, means for operating the rod, engaging means at top of rod to take into the material operated upon, and locking means for the operating mechanism.

2. In a device of the character described, the combination with the main frame, of a vertical rod working in the same, means for operating the rod, and a fork to hold the timber temporarily when it is elevated.

3. In a device of the character described, the combination with the main frame, of a rod operating in the same, a pulley journaled on the frame, a pulley journaled in the base of the rod, and a band connected to the main frame and passing over the pulleys by means of which the rod may be operated.

4. In a device of the character described, the combination with the main frame, of a rod adapted to be operated in the same, and attaching means at the top of the pole to which a rope or the like may be attached for raising the material.

In testimony whereof I affix my signature in presence of two witnesses.

GEORGE R. DODD.

Witnesses:
 U. S. BONHAM,
 J. BOYCE BURRISS.